Jan. 3, 1950   R. E. BLAND   2,492,958
ART OF EMPLOYING FLUENT CATALYST
Filed Jan. 13, 1948
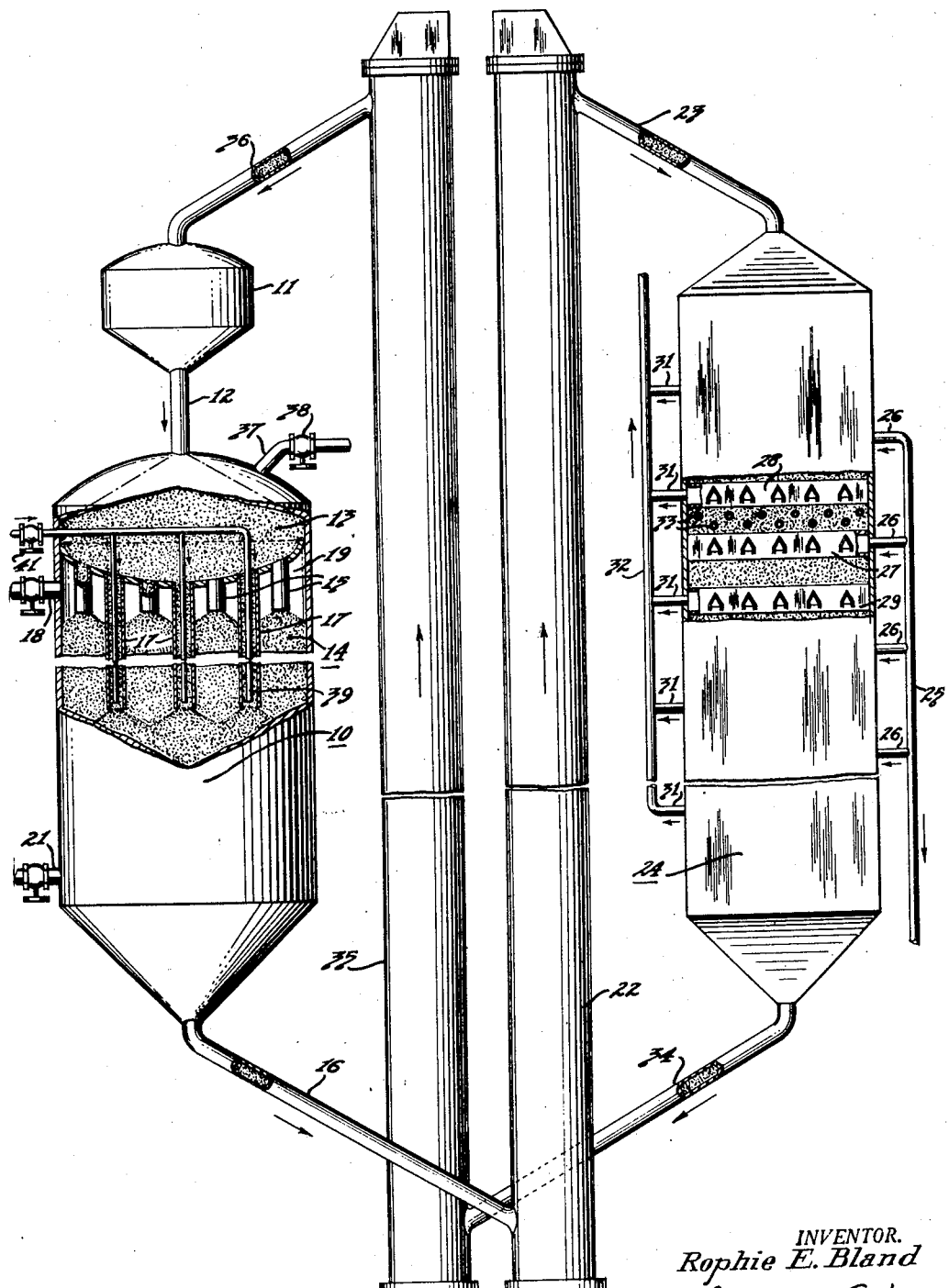
INVENTOR.
Rophie E. Bland
BY
ATTORNEY.

Patented Jan. 3, 1950

2,492,958

UNITED STATES PATENT OFFICE 2,492,958

ART OF EMPLOYING FLUENT CATALYST

Rophie E. Bland, New York, N. Y., assignor to Houdry Process Corporation, Wilmington, Del., a corporation of Delaware Application January 13, 1948, Serial No. 1,927

12 Claims. (Cl. 196—52)

This invention relates to improvements in methods and apparatus employed in the continuous conversion of hydrocarbons wherein hydrocarbons contact particulate fluent solid hydrocarbon conversion catalysts.

When hydrocarbons contact a catalyst under conversion conditions including elevated temperatures, such as above 600° F. to about 1100° F., so as to form conversion products containing hydrocarbons different in molecular weight or structure or both, hydrocarbonaceous material, commonly referred to as coke, is concomitantly deposited on the catalyst and causes a reduction in catalytic activity. The catalyst is therefore periodically regenerated, as by contact with a free oxygen containing gas under combustion conditions, to effect removal of the deposit of coke and thus maintain catalytic activity. Such a hydrocarbon conversion process may be performed as a continuous operation by the use of a technique in which fluent solid hydrocarbon conversion catalyst is circulated in a system comprising a conversion zone and a regeneration zone.

In one method of moving the catalyst through such a system, the solid catalyst is in particulate or granular form, such as spheres or beads, sized particles, cast or extruded pellets or the like, and is sized so that the bulk of the catalyst will pass a three mesh screen and be retained by an eight mesh screen. Catalyst of such a size is fluent or capable of flowing and may conveniently be passed through a process zone for contact with process fluids as a downwardly moving non-turbulent bed (i. e., the process fluids, even when in countercurrent flow relationship, do not cause turbulence or ebullience of the solid and hence the bed is in compact form).

Since most hydrocarbon conversions, particularly cracking, are endothermic reactions, the heat content of the materials in the conversion zone (catalyst, hydrocarbon charge stock and products) is decreased by an amount directly proportional to the extent of conversion. Due to this effect, a non-turbulent bed does not have a constant temperature throughout its vertical extent even when the heat content of the catalyst exceeds the endothermic heat of conversion; the drop in temperature depending, among other factors, on the catalyst to oil ratio and being apparent, even at high ratios (where catalyst to oil ratio is defined as the ratio of weight of catalyst charged to the conversion zone per unit time to the weight of the oil charged to the conversion zone per unit time). At relatively low ratios such as 8–10 to 1, the temperature decrease is marked. At lower catalyst to oil ratios than 8–10 to 1, particularly below 5 to 1, the catalyst bed shows a considerable temperature gradient, decreasing from one end to the other or lower in the middle depending on the relationship between the flow of catalyst and hydrocarbon charge stock and on the temperatures at which the hydrocarbon charge stock and catalyst are introduced to the bed. The conversion operation will have higher yields or less conversion to undesirable by-products, such as coke, or both when the temperature of bed is nearly the same throughout its vertical extent (i. e. tends to be substantially constant). Under such conditions of operation, the entire bed can be at or near the optimum conversion conditions.

In accordance with my invention, I control the temperature of such a bed by employing to advantage the fact that certain catalysts, such as the cracking catalysts described below, evolve considerable heat by the adsorption of water (hydration) when such catalysts are contacted in an unsaturated condition (as regards water vapor) with steam. I use such heat of hydration to compensate at least partially for the loss in heat content and decreased temperature of the bed due to the endothermic effect of the conversion therein. Thus I add hydrocarbon cracking catalyst capable of evolving heat by adsorption of water to a non-turbulent bed as herein described at at least one point intermediate of the vertical extent of said bed and contact said added catalyst with steam.

I may obtain the effect described by hydrating the catalyst with steam already present in the conversion zone, such as by steam introduced to the conversion zone with the hydrocarbon charge stock. Steam introduced with the hydrocarbon charge stock may serve to mitigate the severity of the action of the catalyst or it may be used to aid in the volatilization of a heavy or high boiling hydrocarbon charge stock. Alternatively, the added catalyst may be contacted with steam just prior to its introduction to the conversion zone, particularly where steam is already present in the conversion zone and it is desirable not to decrease its partial pressure.

The invention may be more fully understood from the detailed description set forth below in connection with the accompanying drawing which shows one form of apparatus which may be used for the practical operation of a hydrocarbon cracking system exemplifying a preferred embodiment of the invention. The accompanying drawing is a schematic representation, with conventional details omitted for clarity and brevity, of such system in which certain parts are shown broken and in section for illustrative purposes.

As shown in the drawing, I provide a reactor vessel indicated generally at 10 to which fluent cracking catalyst which has been freshly regenerated as described below is fed from hopper 11 by standpipe 12 to chamber 13. The catalyst in chamber 13 is fed to the top of a non-turbulent bed of catalyst, indicated generally at 14, by pipes or conduits 15, passes downwardly through vessel 10 and is removed therefrom by conduit 16.

A set of pipes or conduits 17 which extend into and below the surface of bed 14 furnish means for adding a portion of the freshly regenerated catalyst from chamber 13 to a plurality of points in a horizontal plane intermediate of the vertical extent of bed 14. Conduits 15 are located so that they distribute catalyst evenly over the horizontal cross sectional area of the bed. Alternatively conduits 17 may comprise two or more sets of conduits each set of which discharges in a different horizontal plane so that successive portions of catalyst are added to the downwardly moving bed.

The bed of catalyst 14 is contacted with a charge stock comprising one or more hydrocarbon fractions, such as those described below, together with steam. Preheated charge stock may be introduced in vapor form through conduit 18 to vapor chamber 19, then pass downwardly in concurrent flow relationship with bed 14 and be removed by a vapor disengaging device (not shown) and conduit 21. (The vapor disengaging device together with other details of construction and operation of both the reactor and regenerator vessels are described in "The 'T. C. C.' Cracking Process For Motor Gasoline Production" by R. H. Newton, G. S. Dunham and T. P. Simpson, "Transactions of the American Institute of Chemical Engineers," volume 41, page 215, April 25, 1945, and the articles there cited.) Alternatively the charge stock may be introduced by conduit 21 and removed by conduit 18, thereby moving countercurrently to the catalyst.

The catalyst removed from vessel 10 by conduit 16 comprises adsorbed water and a deposit of coke as a concomitant result of the cracking operation and contact with steam and is therefore conveyed, as by an elevator 22, to a conduit 23 and discharged into a regenerator vessel indicated generally at 24 in which adsorbed water is desorbed and coke removed from the catalyst by contact with oxygen or an oxygen containing gas. The regenerator vessel or kiln is preferably a multi-stage apparatus, such as that described in the article cited above, which comprises a plurality of stages or burning zones, such as 5 to 10, of the type schematically shown in the broken away portion of the vessel in the drawing. In the stage illustrated, air, which may be preheated, is fed from manifold 25 through conduit 26 and a vapor introduction device 27, then passes both upwardly and downwardly through the catalyst under combustion conditions and is removed by vapor disengaging devices 28 and 29, conduits 31 and manifold 32. Cooling coils 33 are placed appropriately to prevent such a rise in catalyst temperature that deactivation by heat would occur. Freshly regenerated catalyst in an unsaturated condition as regards water vapor is removed from vessel 24 by conduit 34 and conveyed, as by elevator 35, to conduit 36 and discharged into hopper 11.

In accordance with my invention, the catalyst employed is of the type that reversibly adsorbs water vapor or steam within the range of elevated temperatures employed in cracking and in regeneration, such as temperatures from about 750° to 1200° F. and is capable of evolving considerable heat by hydration when contacted by water or steam in an unsaturated condition. A particularly effective catalyst of this type is an active hydrocarbon cracking catalyst comprising substantial amounts of montmorillonite. For example, natural clays of the bentonite type contain substantial amounts of montmorillonite and may be composed principally or completely of such material. Many such clays exhibit commercially acceptable cracking activity in the raw state whereas other bentonitic clays are preferably acid activated or otherwise chemically modified for the improvement of cracking activity. Alternatively, a catalytic contact mass having high cracking activity may be formed by incorporating either raw or activated clays comprising montmorillonite with synthetic plural refractory oxide hydrogels such as combinations of two or more of the following oxides: silica, magnesia, zirconia, alumina, thoria, urania, berylia and the like. In general I prefer that the final catalyst contain at least 15 weight percent and preferably 25 weight percent or more of montmorillonite.

Such catalysts reversibly adsorb water in the temperature range stated above in sufficient amounts that the heat content of the catalyst added intermediate of the vertical extent of the bed after hydration is sufficient to compensate, under the operating conditions, for a substantial portion, such as more than 10 percent, of the heat absorbed by the cracking reaction. For this purpose I prefer to use a catalyst that adsorbs at least 0.1 to 0.2 and preferably of the order of 0.5 or more weight percent of water vapor under the conditions of operation and that the adsorbed water evolve, on hydration, an amount of heat equivalent to at least 800 and preferably of the order of 1200 to 1500 British thermal units per pound of adsorbed water.

The catalysts described above may be used in conjunction with an operation in which a heavy gas oil or a reduced crude, such as a hydrocarbon fraction having a 90 percent boiling above 850° F., is charged to vessel 10 in the presence of an amount of steam, such as between about 5 to 20 weight percent, sufficient to volatilize all of the hydrocarbon charge stock. By using steam in this manner, there is no liquid hydrocarbon material which is heated to temperatures above which thermal decomposition occurs during heating, which temperatures are generally about 850° F. Under cracking conditions as herein described, the hydrocarbon fraction is cracked by the bed of catalyst 14 to form substantial amounts, such as 30 volume percent or greater, of gasoline, the temperature of the bed being correspondingly lowered. To overcome the lowered temperature, I add catalyst, as described above, by conduits 17 in an amount, such as between 10 and 80, and preferably between 25 and 75 percent of the catalyst added through conduits 15, sufficient to compensate at least partially for the loss in heat content, as, for example, so that the heat of the added catalyst after hydration minus the heat content of the same mass at the temperature of the bed at the point of addition is equal to at least 10 percent of the heat of cracking.

The catalyst, on being admitted to the bed, is hydrated by the steam which is present in the cracking zone and which was admitted with the hydrocarbon charge stock by conduit 18. If desired, hydration of the catalyst in conduits 17 may be prevented by admitting a dry inert gas, such as nitrogen, spent flue gas and the like, to chamber 13 by conduit 37, valve 38 being adjusted so that there is only a small flow of the inert gas down conduits 17.

When I wish to maintain the partial pressure of steam in the cracking zone undiminished by the adsorption of a portion of it by the added catalyst, I admit steam to the added catalyst just prior to introduction to bed 14 by means of conduits 39 which are located within conduits 17 and extend almost to the lower end thereof. The amount of such steam is controlled by valve 41 and is preferably just enough to hydrate the added catalyst.

Alternatively, conduits 39 may be employed to prehydrate the added catalyst with steam in an operation in which a high sulfur hydrocarbon charge stock, such as a naphtha or gas oil containing more than 0.5 weight percent of sulfur, is cracked or reformed in bed 14. In such an operation, just sufficient steam may be added with the hydrocarbon charge stock to prehydrate the catalyst introduced to the top of the bed by conduits 15 or conduits 15 may contain means for prehydrating the catalyst. Such prehydration has advantages in the maintenance of catalyst activity at a high level and tends to counteract the accelerated aging of the catalyst by the high sulfur stock.

Since the regeneration of the catalyst must be effected under conditions which, in addition to removing the coke, leave the catalyst in an unsaturated condition in respect to steam or water vapor, I prefer to conduct the regeneration so that the bulk of catalyst attains, at some point in the regeneration, a temperature higher than that averagely used for cracking. Thus I may employ a temperature of cracking in the range of about 800° F. to about 1050° F. and then regenerate the catalyst so that it attains a temperature higher, such as about 50° to 100° F. or more, than that used in cracking, such as about 1050° F. and above, but below the temperature at which heat alone deactivates the catalyst, which is generally about 1400° F.

I also prefer to contact the catalyst at its maximum temperature with an oxygen gas having a low water vapor content of less than 5 volume percent, such as 2 to 3 volume percent or less, to desorb as much of the adsorbed water vapor from the catalyst as is practical and economical. To this end I prefer to use a multi-stage regeneration vessel, such as that described in connection with the drawing. In a multi-stage vessel of the type described, the majority of the water vapor formed by combustion of the coke (which contains considerable hydrogen in combined form) is removed from the vessel and out of contact with the catalyst in the initial stages or zones of combustion as well as a majority of the physically adsorbed water vapor and the latter stages are very effective in bringing the catalyst to an unsaturated condition.

It is, of course, desirable to maintain the freshly regenerated catalyst in as unsaturated condition as possible. To this end, I prefer to maintain the catalyst in a dry atmosphere when it travels from the regenerator vessel to the reactor vessel; thus, a substantially dry atmosphere may be maintained in elevator 35. As previously described, the catalyst in chamber 13 is in an atmosphere of dry inert gas introduced by conduit 37. A portion of the gas so introduced travels up conduit 12 and maintains a dry atmosphere in hopper 11.

It is to be understood that the present invention includes within its scope various hydrocarbon conversion processes employing catalysts capable of reversible hydration such as reforming, alkylation, depolymerization, isomerization and the like or to other processes for converting organic compounds to desired products by employing catalysts in the category defined such as removal of alkyl groups from alkylated cresols, desulfurization of sulfur containing compounds such as alkyl sulfides or disulfides and the like. In the latter type of reaction, small amounts, such as about 5 percent or less, of catalytically active reducible metallic oxides, such as oxides of tin, manganese, vanadium, chromium, and the like may be incorporated in the catalytic contact mass comprising substantial amounts of montmorillonite in order to accelerate the desired conversion of the organic compound involved.

Obviously many modifications and variations of the invention as hereinbefore set forth may be made without departing from the spirit and scope thereof and therefore only such limitations should be imposed as are indicated in the appended claims.

I claim as my invention:

1. The process which comprises introducing active fluent solid catalyst for the conversion of an organic reactant to the top of a conversion zone, passing said catalyst through said zone as a continuous downwardly moving non-turbulent bed, introducing said organic reactant at substantially one end of said bed, passing said organic reactant through substantially the complete vertical extent of said bed under endothermic conversion conditions whereby the heat content of said bed is decreased by the endothermic heat of conversion, adding active fluent solid conversion catalyst to said bed at at least one point intermediate of the vertical extent of said bed, said added catalyst being capable of evolving heat by adsorption of water vapor, contacting said added catalyst with steam whereby the heat of hydration evolved by the adsorption of water vapor by said added catalyst compensates at least in part for the loss in heat content of said bed due to the endothermic heat of conversion, removing catalyst comprising adsorbed water from said conversion zone, desorbing adsorbed water from the catalyst removed from the conversion zone by contacting said catalyst with a relatively dry gas under dehydration conditions, and returning catalyst so dehydrated to the conversion zone.

2. The process which comprises introducing active fluent solid hydrocarbon conversion catalyst at an elevated temperature to the top of a conversion zone, passing said catalyst through said zone as a continuous downwardly moving non-turbulent bed, introducing hydrocarbon charge stock at substantially one end of said bed, passing said hydrocarbon charge stock through substantially the complete vertical extent of said bed under endothermic conversion conditions whereby the heat content of said bed is decreased by the endothermic heat of conversion and whereby coke is concomitantly deposited on said catalyst, adding active fluent solid hydrocarbon cracking catalyst to said bed at at least one point intermediate of the vertical extent of said bed, said added catalyst being capable of evolving heat by adsorption of water vapor, contacting said added catalyst with steam whereby the heat of hydration evolved by the adsorption of water vapor by said added catalyst compensates at least in part for the loss in heat content of said bed due to the endothermic heat of conversion, removing coked catalyst comprising adsorbed water from said conversion zone, desorbing adsorbed water and removing coke from the catalyst removed from the conversion zone by contacting said catalyst with an oxygen containing gas under combustion conditions, and returning catalyst so regenerated to the conversion zone.

3. The process which comprises introducing active fluent solid hydrocarbon cracking catalyst at an elevated temperature to the top of a conversion zone, passing said catalyst through said zone as a continuous downwardly moving non-turbulent bed, introducing hydrocarbon charge stock and steam at substantially one end of said bed, passing said hydrocarbon charge stock and steam through substantially the complete vertical extent of said bed under endothermic conversion conditions whereby the heat content of said bed is decreased by the endothermic heat of conversion and whereby coke is concomitantly deposited on said catalyst, adding active fluent solid hydrocarbon cracking catalyst to said bed at at least one point intermediate of the vertical extent of said bed, said added catalyst being capable of evolving heat by adsorption of water vapor, whereby the heat of hydration evolved by the adsorption by said added catalyst of water vapor present in the conversion zone compensates at least in part for the loss in heat content of said bed due to the endothermic heat of conversion, removing coked catalyst comprising adsorbed water from said conversion zone, desorbing adsorbed water and removing coke from the catalyst removed from the conversion zone by contacting said catalyst with an oxygen containing gas under combustion conditions, and returning catalyst so regenerated to the conversion zone.

4. The process which comprises introducing active fluent solid hydrocarbon cracking catalyst at an elevated temperature to the top of a conversion zone, passing said catalyst through said zone as a continuous downwardly moving non-turbulent bed, introducing hydrocarbon charge stock at substantially one end of said bed, passing said hydrocarbon charge stock through substantially the complete vertical extent of said bed under endothermic conversion conditions whereby the heat content of said bed is decreased by the endothermic heat of conversion and whereby coke is concomitantly deposited on said catalyst, adding active fluent solid hydrocarbon cracking catalyst to said bed at at least one point intermediate of the vertical extent of said bed, said added catalyst being capable of evolving heat by adsorption of water vapor, contacting said added catalyst with steam prior to its introduction to the conversion zone whereby the heat of hydration evolved by the adsorption of water vapor by said added catalyst compensates at least in part for the loss in heat content of said bed due to the endothermic heat of conversion, removing coked catalyst comprising adsorbed water from said conversion zone, desorbing adsorbed water and removing coke from the catalyst removed from the conversion zone by contacting said catalyst with an oxygen containing gas under combustion conditions, and returning catalyst so regenerated to the conversion zone.

5. The process which comprises introducing a portion of freshly regenerated hydrocarbon cracking catalyst comprising substantial amounts of montmorillonite to the top of a cracking zone, passing said catalyst through said cracking zone as a continuous downwardly moving non-turbulent bed, introducing hydrocarbon charge stock higher boiling than gasoline at substantially one end of said bed, passing said hydrocarbon charge stock through substantially the complete vertical extent of said bed under endothermic cracking conditions whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, contacting said added catalyst with steam whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with an oxygen containing gas under combustion conditions, and returning the catalyst so regenerated to the cracking zone.

6. The process of claim 5 in which the catalyst comprises at least 15 weight percent of montmorillonite.

7. The process of claim 5 in which the catalyst comprises more than 25 weight percent of montmorillonite.

8. The process which comprises introducing a portion of freshly regenerated hydrocarbon cracking catalyst comprising substantial amounts of montmorillonite to the top of a bed of said catalyst in a cracking zone, passing said catalyst through said cracking zone as a continuous downwardly moving non-turbulent bed, introducing hydrocarbon charge stock higher boiling than gasoline at substantially one end of said bed, passing said hydrocarbon charge stock through substantially the complete vertical extent of said bed under endothermic cracking conditions whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, said catalyst added intermediate of the vertical extent of the bed amounting to between 10 and 80 percent of the catalyst introduced to the top of the bed, contacting said added catalyst with steam whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with an oxygen containing gas under combustion conditions, and returning the catalyst so regenerated to the cracking zone.

9. The process which comprises introducing a portion of freshly regenerated hydrocarbon cracking catalyst comprising substantial amounts of montmorillonite to the top of a cracking zone, passing said catalyst through said cracking zone as a continuous downwardly moving non-turbulent bed, introducing hydrocarbon charge stock higher boiling than gasoline at substantially one end of said bed, passing said hydrocarbon charge stock through substantially the complete vertical extent of said bed under endothermic cracking conditions and at temperatures between above about 800° and below 1050° F. whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, contacting said added catalyst with steam whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with oxygen containing gas of low water vapor content under combustion conditions such that the bulk of the catalyst attains a maximum temperature at least 50° F. higher than the average cracking temperature, and returning the catalyst so regenerated to the cracking zone.

10. The process which comprises introducing a portion of freshly regenerated hydrocarbon cracking catalyst comprising substantial amounts of montmorillonite to the top of a cracking zone, passing said catalyst through said cracking zone as a continuous downwardly moving non-turbulent bed, introducing a hydrocarbon fraction having a 90 percent boiling point higher than 850° F. and sufficient steam to volatilize said fraction at about 850° F. at substantially one end of said bed, passing said hydrocarbon fraction and steam through substantially the complete vertical extent of said bed under endothermic cracking conditions whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with an oxygen containing gas under combustion conditions, and returning the catalyst so regenerated to the cracking zone.

11. The process which comprises introducing a portion of freshly regenerated hydrocarbon cracking catalyst comprising substantial amounts of montmorillonite to the top of a cracking zone, passing said catalyst through said cracking zone as a continuous downwardly moving non-turbulent bed, introducing hydrocarbon charge stock higher boiling than gasoline at substantially one end of said bed, passing said hydrocarbon charge stock through substantially the complete vertical extent of said bed under endothermic cracking conditions whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, contacting said added catalyst with steam whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with an oxygen containing gas of low water vapor content under combustion zone conditions, and returning the catalyst so regenerated to the cracking zone in a dry atmosphere.

12. The process which comprises introducing a portion of freshly regenerated hydrocarbon cracking catalyst comprising at least 25 weight percent of montmorillonite to the top of a bed of said catalyst in a cracking zone, passing said catalyst through said cracking zone as a continuous downwardly moving non-turbulent bed, introducing a hydrocarbon fraction having a 90 percent boiling point higher than 850° F. and sufficient steam to volatilize said fraction at about 850° F. at substantially one end of said bed, passing said hydrocarbon fraction and steam through substantially the completet vertical extent of said bed under endothermic cracking conditions and at temperatures between above about 800° and below 1050° F. whereby substantial amounts of gasoline are formed from said charge stock with the concomitant deposit of coke on the catalyst and whereby the heat content of said bed is decreased, adding a portion of said freshly regenerated catalyst to said bed at at least one point intermediate of the vertical extent of said bed, said catalyst added intermediate of the vertical extent of the bed amounting to between 10 and 80 percent of the catalyst introduced to the top of the bed, whereby the heat of hydration evolved by the adsorption of water on said added catalyst compensates at least in part for the loss in heat content of said bed due to the endothermic heat of cracking, removing coked catalyst having adsorbed water thereon from the bottom of said bed, desorbing adsorbed water and removing coke from the catalyst removed from the cracking zone by contacting said catalyst with oxygen containing gas of low water vapor content under combustion conditions in a multi-stage regeneration zone, said combustion conditions being such that the bulk of the catalyst attains a maximum temperature at least 50° F. higher than the average cracking temperature, and returning the catalyst so regenerated to the cracking zone in a dry atmosphere.

ROPHIE E. BLAND.

No references cited.